Figure 1:
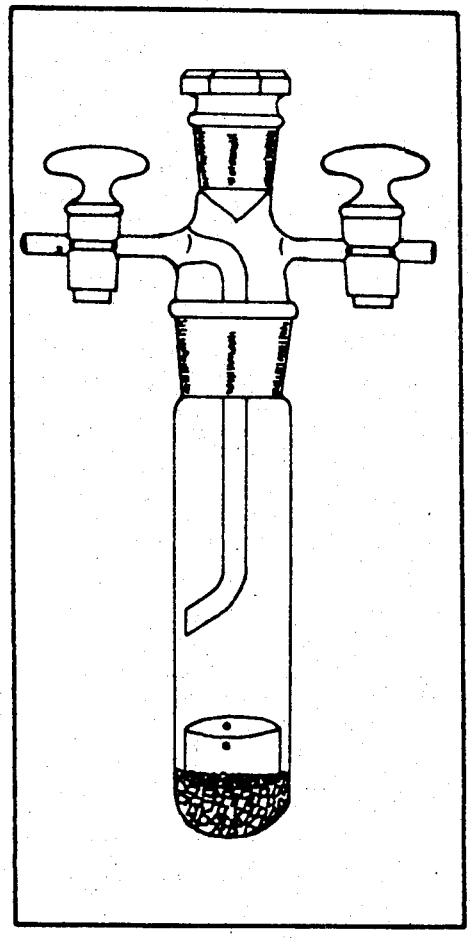

March 19, 1968  V. CAPPUCCIO ET AL  3,374,215
SYNTHETIC POLYMER COMPOSITIONS HAVING A PARTICULAR
RECEPTIVITY TO DYESTUFFS AND A PROCESS
FOR PREPARING THEM Filed Sept. 13, 1965  2 Sheets-Sheet 1

VITTORIO CAPPUCCIO
SALVATORE ALGIERI
INVENTORS,

BY

United States Patent Office 3,374,215
Patented Mar. 19, 1968

3,374,215
SYNTHETIC POLYMER COMPOSITIONS HAVING A PARTICULAR RECEPTIVITY TO DYESTUFFS AND A PROCESS FOR PREPARING THEM
Vittorio Cappuccio, Terni, and Salvatore Algieri, Rome, Italy, assignors to Montecatini Edison S.p.A., Milan, Italy, a corporation of Italy
Filed Sept. 13, 1965, Ser. No. 486,622
Claims priority, application Italy, Sept. 16, 1964, 19,867/64
6 Claims. (Cl. 260—93.7)

The present invention relates to the preparation of textile fibers as well as films, tapes, shaped articles and the like, comprising synthetic polymers which have good dyeability and fastness with disperse dyestuffs and chelating dyestuffs.

More particularly, the present invention relates to the preparation of dyeable textile fibers by extrusion of mixes of synthetic polymers with compounds of metals of Group II–B of the Periodic Table, i.e., zinc, cadmium and mercury, with phenol sulfides of the type

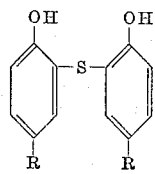

wherein R is hydrogen or a linear or a branched alkyl group having up to 20 C. atoms, such as methyl, ethyl, n-octyl, 1,1,3,3-tetramethylbutyl and the like. Preferred alkyls are methyl, ethyl, butyl, n-octyl and 1,1,3,3-tetramethylbutyl.

The synthetic polymers used in the present invention comprise polyolefins obtained by low pressure polymerization with stereospecific catalysts. Crystalline polypropylene consisting essentially of isotactic macromolecules is a preferred polyolefin. Also suitable for use in the present invention are other polyolefins deriving from monomers having the formula $RCH=CH_2$ in which R is an alkyl or aryl group or a hydrogen atom, such as polyethylene, poly (butene-1), poly (4-methyl pentene-1), polystyrene and the like.

Some methods for modifying the receptivity to dyestuffs of polypropylene fibers by addition to the polymer, before spinning, of various substances capable of modifying the dyeability of the fibers are known.

The addition of metal compounds to polyolefins in order to improve the stability of the compositions has been disclosed in patents.

It has recently been found that metal compounds incorporated in polyolefins can make the compositions receptive to special dyes of the so-called chelating type, which are able to yield stable complexes with the metal present in the composition.

A variety of these dyes have recently appeared on the market. They are: "National Polypropylene," produced by Allied Chemical; "Olefin," by Verona Bayer; "Daito," manufactured by Daito Chem. Co. Ltd.; and "Aizen," by Hodogaya Chem. Co. Ltd. However, as a result of experimental tests, it has been found that the addition of any metal compound (of Ni, Zn, Cu, etc.) is not sufficient to render polyolefins receptive to chelating type dyes: nickel derivatives of phenolic sulphides, disclosed in U.S. Patent No. 2,971,940 by Ferro Chem. Co., e.g., impart to polyolefins receptivity to the dyes of the type "National Polypropylene," while nickel or zinc derivatives of the N,N-dibutyldithiocarbamic acid are not able to make polyolefins dyeable with these dyes.

The use of nickel derivatives of phenolic sulphides, disclosed in U.S. Patent No. 2,971,940, as tinctorial modifiers for polyolefins, however, show some drawbacks: first of all in order to obtain a good dye-receptivity, substantial amounts of fillers are required (the composition must contain at least 0.1% metal) and as a consequence, the fibers show a certain green colouring which limits their use in the textile field. Secondly, nickel derivatives of phenolic sulphides cannot be employed in processes requiring temperatures equal to or higher than 260° C., since blackening of the entire composition results.

The present invention provides a process for preparing almost colorless fibers, made from high polymers, having a particular receptivity to disperse dyestuffs and to chelating dyestuffs. A further aspect of the present invention is in the products obtainable as a result of this process, namely fibers having solid colors.

We have, in fact, surprisingly found that textile fibers having a particular affinity to disperse and chelating dyestuffs are obtained by extruding mixes of high polymers with from about 0.1–10% by weight, based on the weight of polymer, of compounds of metals of Group II-B of the Periodic Table, particularly Zn and Cd, with phenol sulfides of the formula

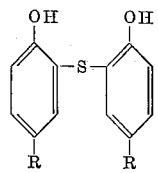

wherein R has the above mentioned meaning.

The synthesis of the compounds used for the tinctorial modification of the polymers according to the present invention is carried out by reacting the phenol sulfide with a salt of a metal of Group II-B, preferably in the presence of solvents. The reaction can be carried out by heating the reactants. The formation of the metal compounds of the invention is generally accompanied by precipitation thereof, the compounds being recovered by filtration.

The addition of the metal compounds to the polymer, is generally carried out by simply mixing the metal compound with the polymer while agitating. The addition can, however, be carried out by other methods, such as mixing the polymers with a solution of the metal compound in a suitable solvent, followed by evaporation of the solvent, or by addition of the metal compound to the polymer at the end of the polymerization.

It is also possible to apply the metal compound to the manufactured article, e.g., by immersing the same in a solution or dispersion of the metal compound and then evaporating the solvent. The application can be carried out before or after stretching, for times ranging from a few seconds to some hours, at temperatures varying from room temperature to 10° C. below the softening point of the polymer.

The mixes are preferably granulated and then extruded in a melt spinning device, preferably of the type described in Italian Patent No. 614,043, and preferably through spinnerets, of the type described in Italian Patent No. 600,248, having holes with a length/diameter ratio higher than 1. The granulation and spinning are carried out by operating in the absence of oxygen, preferably under an inert gas atmosphere (e.g., nitrogen). The spinning of the mixes is conveniently carried out in the presence of a small amount of a solid dispersing agent (for instance those described in Italian Patent 608,856).

During the mixing, in addition to the metal compounds according to the present invention, opacifiers and organic or inorganic pigments can also be added to the polymers.

The fibers, after spinning, are subjected to a stretching process, with stretching ratios between about 1:2 and 1:10, at temperatures of between about 80° and 150° C., in stretching devices heated with hot air, steam or a similar fluid, or provided with a heating plate.

The fibers can then be subjected to a dimensional stabilization treatment under free or inhibited shrinking conditions, at 80–160° C. as described in Italian Patents Nos. 566,914 and 588,318, or U.S. Patent 3,106,442.

The fibers obtained by extrusion of the mixes of the present invention can be mono- or multi-filaments and can be used for preparing continuous or staple yarns or for preparing bulky yarns or staple.

The mixes of the present invention can be used not only for preparing yarns but also for preparing films, tapes, shaped articles and the like. The fibers and shaped articles obtained according to the present invention have a remarkable receptivity for disperse dyestuffs and for chelating dyestuffs.

Some measurements were carried out on the metal compounds of the present invention according to the methods reported below.

(1) Measurement of the volatility of metal compounds

The measurements were taken under air and under nitrogen.

For the measurements under air, the weight losses were determined in a muffle furnace at 250° C. and at 300° C. according to a method analogous to that described by R. G. Charles, J. Inorg. Nucl. Chem. 9, 145 (1959) on samples of 3–5 g. in a porcelain crucible.

For the measurements under nitrogen the weight losses were determined at 250° C. and at 300° C. in the device shown in FIGURE 1 and consisting of a Pyrex glass test tube. The test tube was immersed in a molten salts bath after intrduction of 0.5–1 g. of sample into a glass cup placed on the bottom of the test tube. Before introduction into the molten salts bath the test tube is placed under vacuum and then washed with nitrogen, by repeating the operation several times. During the whole test a nitrogen head is maintained in the test tube.

The samples, before treatment at 250° C. and 300° C. under air or nitrogen, are dried at 120° C. to constant weight.

(2) Determination of compatibility from measurements of the crystallization rate With the aid of a new technique based on measurements of the crystallization rate described in an article of P. Parrini and G. Gorrieri, "compatibility of polymeric and non-polymeric substances with crystalline polymers," the degree of compatibility of metal additives with polypropylene was determined. This method makes it possible to determine the compatibility of the metal additives with polypropylene on the basis of the fact that compatible substances increase the crystallization time while non-compatible substances reduce it.

The additive is thoroughly mixed with polypropylene either by mechanical mixing or by dissolving the additive in a suitable solvent which is inert in respect of polypropylene. The mix is dried and then hot molded in a Carver press into laminae having a thickness of 1 mm., which are then cut into pieces and introduced into dilatometers filled with mercury, according to the technique described by P. Parrini and G. Gorrieri in Makromol. Chem. 62, 83 (1963).

The dialatometric measurements allow the determination of the specific volume of the sample to be examined, as a function of time at constant temperatures. From the curves of specific volume as a function of time one can determine the semicrystallization times which are an index of the crystallization rate of the polymer.

The presence of compatible substances increases the semicrystallization times while presence of non-compatible substances either decreases them or leaves them unchanged in respect of those found for the additive-free polymer under the same conditions. By carrying out the measures of compatibility with increasing percentages of additive it is possible to draw a semicrystallization time/concentration curve which can be converted to a true compatibility curve.

Figure 2:
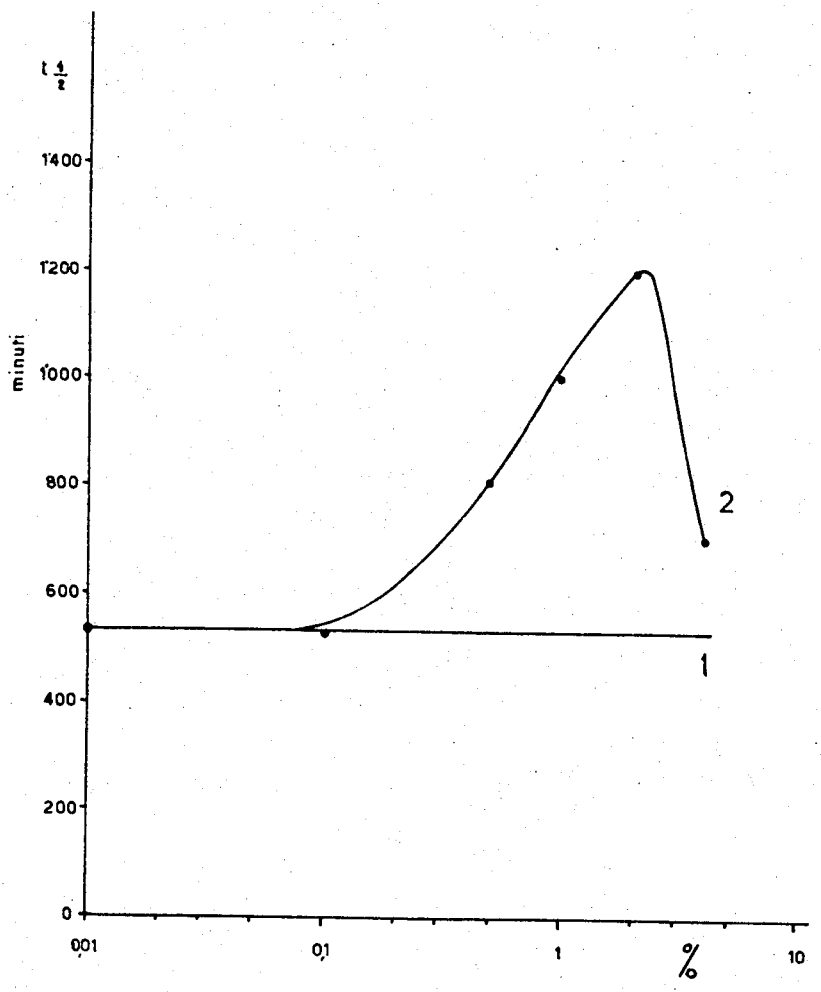

In FIGURE 2 the compatibility curves of one of the tested systems are reported. From the curves it appears that if the crystallization time increases by increasing the additive concentration the additive can be considered as compatible; if, on the contrary, the increase in the additive concentration does not cause any increase in the crystallization time, the upper limit of compatibility of the additive with polypropylene (beyond which the additive is no more compatible) has been reached.

In FIGURE 2, curve 1 relates to additive-free polypropylene and the other curve to polypropylene mixed with the metal derivatives.

(3) Dyeing methods and dyestuffs (a) *Purging.*—The fibers are purged with a solution of Diapon T (Montecatini product) (2 g./l.) and sodium carbonate (1 g./l.) at 60° C. for 20–30 minutes; they are then carefully rinsed with water.

(b) *Chelating dyestuffs (Olefin and Naprolene classes).*—The dyestuffs are prepared by kneading with the same weight of a 10% solution of Dispergal O (Montecatini product); warm water is then added to complete the volume.

The dyeing is carried out with a fiber/dye bath ratio of 1:30. Water is heated to 40° C.; 6% of Dispergal O and 2% (by weight of the fiber) of a 56% acetic acid solution to establish a pH of 3.5–4 are added. The fibers are immersed in the dye bath and after 15–20 minutes the dyestuff is added and the dye bath is heated to the boiling point within 45 minutes; it is then kept at the boiling point for 60–90 minutes. The dyed fibers are washed with a 2% solution of Dispergal O for 20 minutes at 95° C. and then rinsed with running water.

The following dyestuffs were used:

Olefin class (produced by Verona-Bayer)—
    Yellow _____ 13863
    Orange _____ 13904
    Orange _____ 13955
    Orange _____ 2352
    Bordeaux _____ 14096
    Bordeaux _____ 13906
    Blue _____ 14110
    Dark blue _____ 13954

*National Polypropylene* (produced by the Allied Chemical)—
    National Polypropylene brilliant yellow GM.
    National Polypropylene brilliant orange RM.
    National Polypropylene scarlet RBM.
    National Polypropylene brilliant violet 3 RM.
    National Polypropylene brilliant blue BM.
    National Polypropylene dark blue 2 BM.
    National Polypropylene green BM.

(b1) *Chelating dyestuff (Aizen and Daito classes)*.—
The dyestuffs are prepared by kneading with the same weight of a 10% solution of PK salt K (Daito Chem. Co. Ltd.); warm water is then added to complete the volume.

The dye bath is composed of:

| | |
|---|---|
| Dyestuff | PK salt K. |
| Concentration | 1 g./l. |
| Bath ratio | 1:50. |
| pH | Neutral or weak acidic (pH 4). |

The fibres are immersed into the dyebath which is heated to boiling point within 40–50 min.; it is then kept at the boiling point for 60–90 minutes. The dyed fibres are rinsed sufficiently with hot water, then subjected to a reduction clearing and are again rinsed with water. Composition of reduction clearing bath and treatment conditions are as follows:

| | |
|---|---|
| Hydrosulphite _____g./l__ | 1.5 |
| Sodium carbonate _____g./l__ | 1 |
| Pepelon S-4, (Yoshimura Yukagaki Co.) ___g./l__ | 1 |
| Bath ratio _____ | 1:50 |
| Temperature _____° C__ | 80 |
| Time _____min__ | 30 |

The following dyestuffs were used:

Aizen class (produced by Hodogaya)—

Yellow Aizen FGRL.
Yellow Aizen GRL.
Orange Aizen GL.
Yellow Aizen GL.
Red Aizen BL.
Red Aizen 3BL.
Violet Aizen RL.
Blue Aizen FBRL.

Daito class (produced by Daito)—

Yellow Daito GGK
Yellow Daito HRK.
Red Daito GK.
Scarlet Daito RK.
Rubin Daito BK.
Brilliant Blue Daito GK.
Blue Daito 3BK.
Blue Daito BK.

(c) *Disperse dyestuffs*.—The dyeing were carried out with a fiber/dye bath ratio of 1:30. Water was heated to 40° C., the fibers were introduced and the dispersion of dyestuffs in water was added. The dye bath was heated to the boiling point and kept at this temperature for 60 minutes. The dyed fibers were washed with a solution containing 1 cc./l. of a surface active agent (Aionico SCl, a Montecatini product) for 20 minutes at 40° C. and then rinsed with running water.

The following dyestuffs were used in the tests:

Polisetile dyestuffs (ACNA)—

Yellow ER.
Scarlet GR.
Pink B.
Blue FB.

Normal disperse dyestuffs—

Setacyl yellow 3G (C.I.: disperse yellow 20) (Geigy).
Cibacet scarlet BR (C.I. disperse red 18) (Ciba).
Setacyl brilliant blue BG (C.I.: disperse blue 3) (Geigy).
Duranol brilliant yellow 6G (C.I.: 58.900) (I.C.I).
Dispersol solid orange G (C.I.: 11.005) (I.C.I.).
Artisil direct orange 2R (C.I.: 11.005) (Sandoz).

(4) *Evaluation of color fastness*

The color fastnesses were determined according to the following specifications:

| | Specification Unitex |
|---|---|
| Washing fastness (95° C.) _____ | 11 |
| Fastness to washing wtih trichloroethylene _____ | 14 |
| Fastness to perspiration _____ | 13 |
| Fastness to rubbing _____ | 15 |

In the spinning tests reported in the following examples, polypropylene having the following characteristics was used:

| | |
|---|---|
| Intrinsic viscosity (determined in Tetrahydronaphthalene at 135° C. _____ | 1.56 |
| Ash content, percent _____ | 0.015 |
| Residue after heptane extraction, percent _____ | 96.2 |

The following examples illustrate the invention without limiting its scope.

EXAMPLE 1

A solution of 200 g. (0.63) mole) of 2,2'-thiobis[4-(1,1,3,3 - tetramethylbutyl)phenol] (2,2'-dehydroxy-4,4'-dioctyl-diphenyl sulfide) in 700 cc. of methanol and a solution of 138 g. (0.63 mole) of zinc acetate dihydrate in 1,400 cc. of methanol were mixed warm and refluxed for 4 hours. The reaction mixture was allowed to cool to about 40° C. and the precipitate was then filtered and washed with warm methanol.

Yield: 170 g. of white solid which does not melt at a temperature lower than 250° C. (at 330° C. said product starts to decompose).

The zinc phenol sulfide was soluble in benzene and insoluble in water, ethanol, methanol, acetone, chloroform, heptane.

*Analysis*.—Zn percent=13.7 (calculated for

$C_{28}H_{40}O_2SZn=13.0$)

S percent=5.4 (calculated for $C_{28}H_{40}O_2SZn=6.3$).

The zinc phenol sulfide appeared to be compatible with polypropylene up to 2%, as seen from FIGURE 2.

The measurement of volatility gave the following results:

| | Weight loss, percent | | | |
|---|---|---|---|---|
| | In air | | In nitrogen | |
| | At 250° C. | At 300° C. | At 250° C. | At 300° C. |
| After 1 hour_____ | 6.4 | 7.2 | 3.3 | 6.5 |
| After 2 hours_____ | 6.6 | 7.8 | 4.5 | 7.2 |

10 g. of metal compound were mixed with 0.979 kg. of polyproplene together with 2.5 g. of 1,1',3-tris(4-hydroxy-3-methyl-6 tert.butyl-phenyl)butane, 1 g. of calcium stearate, 1 g. of TiO$_2$ and 6 g. of trisnonylphosphate at room temperature in a Henschel type mixer.

The mix obtained was granulated in an extruder under an oxygen-free atmosphere at 230° C.

The granulate obtained was spun in a melt spinning device under the following conditions:

Spinning conditions—

| | |
|---|---|
| Screw temperature _____° C__ | 260 |
| Head temperature _____do____ | 280 |
| Spinneret temperature _____do____ | 270 |
| Spinneret type _____mm__ | 40/0.8×16 |
| Max. pressure (kg./cm.²) _____do____ | 76 |
| Winding speed (m./minute) __do____ | 500 |

Stretching conditions—

| | |
|---|---|
| Temperature _____° C__ | 130 |
| Medium _____ | heated plate |
| Stretching ratio _____ | 1:4.6 |

After stretching, the fiber has the following characteristics:

Tenacity (g./d.) _____ 5.1
Elongation percent _____ 38

The fibers obtained have a good dyeability and fastnesses with chelating dyestuffs (Olefin, Daito, Aizen, and National Polypropylene classes) and with disperse dyestuffs. Following fastnesses were obtained:

| Dyestuff | FASTNESSES | | | |
|---|---|---|---|---|
| | Washing C | Perspiration | Trichloroethylene | Rubbing |
| Aizen Blue FGL | 4-4/5-4/5 | 4-5-5 | 4-5-5 | 5 |
| Aizen Red BL | 4-4-5 | 4/5-5-4/5 | 4-5-5 | 5 |
| Aizen Yellow GRL | 3/4-4/5-5 | 4-5-5 | 4-4/5-5 | 5 |
| Nat. Polypr. brill. yellow GM | 4-4/5-5 | 4/5-5-5 | 4/5-5-5 | 4/5 |
| Nat. Polypr. brill. violet 3RM | 4-4-4/5 | 4-5-5 | 4-5-5 | 4/5 |
| Nat. Polypr. dark blue BM | 4-4-4 | 4-5-5 | 4-5-5 | 4/5 |
| Olefin Orange 13904 | 4-4-5 | 4-5-5 | 4-5-5 | 4/5 |
| Daito Yellow GGK | 4-4/5-5 | 4-5-5 | 4-5-5 | 5 |
| Daito Rubin BK | 4-4-4 | 4-5-4/5 | 4-5-5 | 4 |
| Daito Red GK | 4-3/4-4 | 4-5-5 | 4-5-5 | 4/5 |

EXAMPLE 2

A solution of 151 g. (0.34 mole) of 2,2'-thiobis-[4-(1,1,3,3-tetramethylbutyl)phenol] in 400 cc. of methanol and a solution of 88 g. (0.34 mole) of cadmium acetate dihydrate in 800 cc. of methanol were mixed in the warm and refluxed for 4 hours. The whole was left to cool to about 40° C. and the precipitate was filtered and then washed with warm methanol.

Yield: 80 g. of a white solid which does not melt at temperature lower than 250° C.

The product was soluble in benzene and heptane and insoluble in water, ethanol, methanol, acetone, chloroform and dioxane.

*Analysis.*—Cd percent=18.85 (calculated for $$C_{28}H_{40}O_2SCd=20.4)$$

S percent=5.30 (calculated for $C_{28}H_{40}O_2SCd=5.8$).

The measurements of the volatility gave the following results:

| | Weight loss, percent | | | |
|---|---|---|---|---|
| | In air | | In nitrogen | |
| | At 250° C. | At 300° C. | At 250° C. | At 300° C. |
| After 1 hour | 6.6 | 10 | 7.3 | 9.1 |
| After 2 hours | 7 | 11 | 7.4 | 9.4 |

6 g. of metal compound were mixed with 0.983 of polypropylene together with 1.5 g. of 1,1',3-tris(4-hydroxy-3-methyl-6 tert. butyl-phenyl)butane, 6 g. of lauryl thiodipropionate, 11 g. of calcium stearate and 2 g. of TiO₂ at room temperature in a Henschel type mixer.

The mix obtained was granulated in an extruder under an oxygen-free atmosphere at 230° C.

The granulate obtained was spun in a melt spinning device under the following conditions:

Spinning conditions—
  Screw temperature _____° C__ 250
  Head temperature _____° C__ 250
  Spinneret temperature _____° C__ 245
  Spinneret type _____mm__ 40/0.8×16
  Max. pressure (kg./cm.²) _____ 68
  Winding speed (m./minute) _____ 500
Stretching conditions—
  Temperature _____° C__ 130
  Medium _____ steam
  Stretching ratio _____ 1:5

After stretching the fibers have the following characteristics:

Tenacity (g./d.) _____ 5
Elongation (percent) _____ 32

The fibers obtained have a good dyeability with chelating dyestuffs (Olefin and National Polypropylene) and disperse dyestuffs and the colors are fast.

EXAMPLE 3

A solution of 218.2 g. (1 mole) of 2,2'-thiobisphenol (2,2'-dihydroxydiphenyl sulfide) (having a melting point of 142° C.) in 300 cc. of methanol was added to a solution of 219 g. (1 mole) of zinc acetate dihydrate in 300 cc. of methanol.

The whole was refluxed for 4 hours. After cooling to room temperature the precipitate thus formed was filtered and washed with methanol. A white powder was obtained.

1 g. of the product metal compound was added to 99 g. of polypropylene, admixed with the same additives and in the same proportions as in Example 1, and mixed at room temperature for 4 hours.

The mixture was granulated and then spun in a laboratory melt spinning device at 250° C. with a spinneret 4/0.8×16 mm.

The fibers were stretched (stretching ratio 1:4.5 at 130° C.) in a laboratory device and subjected to dyeing tional Polypropylene) whereupon intense solid colors were obtained.

EXAMPLE 4

A solution of 246.25 g. (1 mole) of 2,2'-thiobis (4-methylphenol), having a melting point of 118° C., in 300 cc. of methanol was added to a solution of 219 g. (1 mole) of zinc acetate dihydrate in 300 cc. of methanol.

The whole was refluxed for 4 hours. After cooling to room temperature the precipitate formed was filtered and washed with methanol. A white powder was obtained.

1 g. of the product metal compound was added to 99 g. of polypropylene, admixed with the same additives and in the same proportion as in Example 1, and mixed at room temperature for 4 hours. The mixture was granulated and then spun in a laboratory melt spinning device at 250° C. with a spinneret 4/0.8×16 mm.

The fibers were stretched (stretching ratio 1:4.5 at 130° C.) with a laboratory device and subjected to dyeing with chelating dyestuffs (Olefin, Aizen, Daito, National Polypropylene). Intense solid colors were obtained.

EXAMPLE 5

A solution of 482.68 g. (1 mole) of 2,2'-thiobis (4-nonylphenol) in 500 cc. of methanol was added to a solution of 210 g. (1 mole) of zinc acetate dihydrate in 300 cc. of methanol.

The whole was refluxed for 4 hours. After cooling to room temperature the precipitate formed was filtered and washed with methanol. A white powder is thus obtained.

1 g. of the product metal compound was added to 99 g. of polypropylene, admixed with the same additives and in the proportions as in Example 1, and mixed at room temperature for 4 hours.

The mix was granulated and then spun in a laboratory melt spinning device at 250° C. with a spinneret 4/0.8×16 mm.

The fibers were stretched (stretching ratio 1:4.5 at 130° C.) with a laboratory device and subjected to dyeing with chelating dyestuffs (Olefin, Aizen, Daito, National Polypropylene). Intense solid colors were obtained.

It will be appreciated that various modifications and variations can be made in the details of the practical realization of the present invention without departing from the spirit and scope of the invention.

We claim:
1. A polyolefin composition having a good dyeability and fastness with dispersed dyestuffs and chelating dyestuffs comprising a polyolefin and from about 0.1–10% by weight based on said polyolefin of a compound of a metal of Group II–B with a phenol sulfide of the formula

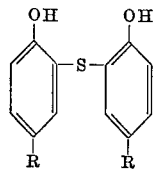

wherein R is a member selected from the group consisting of hydrogen, a straight alkyl radical having 1 to 20 carbon atoms and a branched alkyl radical having 1 to 20 carbon atoms.

2. The composition of claim 1 wherein the polyolefin is polypropylene consisting essentially of isotactic macromolecules.

3. The composition of claim 1 wherein the metal of Group II–B of the Periodic Table is zinc or cadmium.

4. The composition of claim 1 wherein the phenol sulfide is 2,2'-thiobis[4-(1,1,3,3-tetramethylbutyl)phenol] or 2,2'-thiobisphenol.

5. The composition of claim 1 in the form of textile fibers, yarns, films, tapes or other shaped articles.

6. The composition of claim 1 in the form of a spinning mixture.

References Cited
UNITED STATES PATENTS 2,971,940   2/1961   Fuchsman.

JOSEPH L. SCHOFER, *Primary Examiner.*

L. EDELMAN, *Assistant Examiner.*

UNITED STATES PATENT OFFICE
CERTIFICATE OF CORRECTION

Patent No. 3,374,215

March 19, 1968

Vittorio Cappuccio et al.

It is certified that error appears in the above identified patent and that said Letters Patent are hereby corrected as shown below:

Column 8, lines 27 and 28, strike out "dyeing tional Polypropylene)" and insert instead -- dyeing with chelating dystuffs (Olefin, Aizen, Daito and National-Polypropylene) --.

Signed and sealed this 8th day of July 1969.

(SEAL)
Attest:

Edward M. Fletcher, Jr.
Attesting Officer

WILLIAM E. SCHUYLER, JR.
Commissioner of Patents